March 7, 1944.    L. S. WILLIAMS    2,343,622
WEIGHING SCALE
Filed Nov. 28, 1941    2 Sheets-Sheet 1
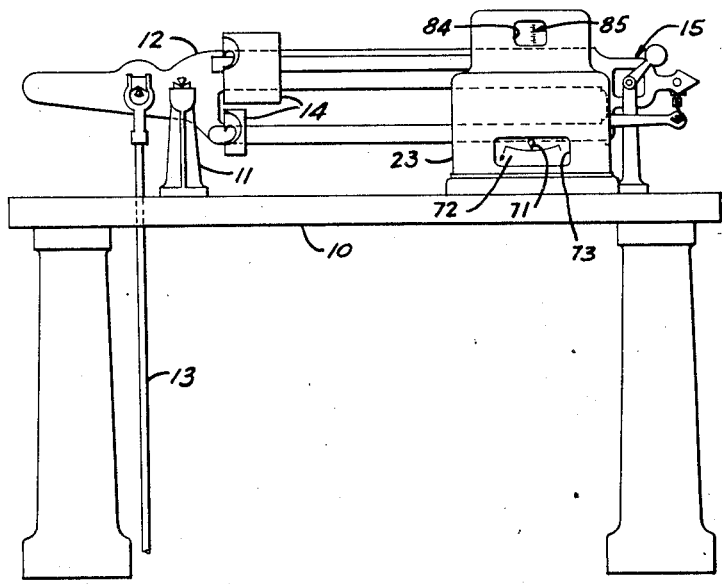
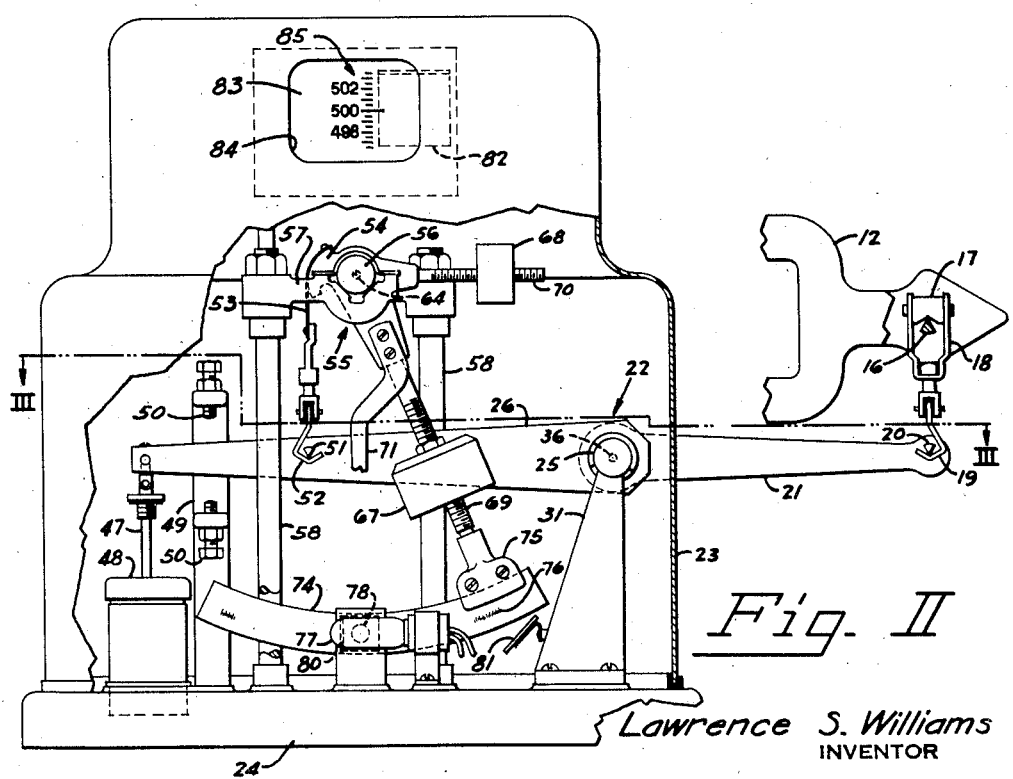
Lawrence S. Williams
INVENTOR
BY Marshall & Marshall
ATTORNEYS

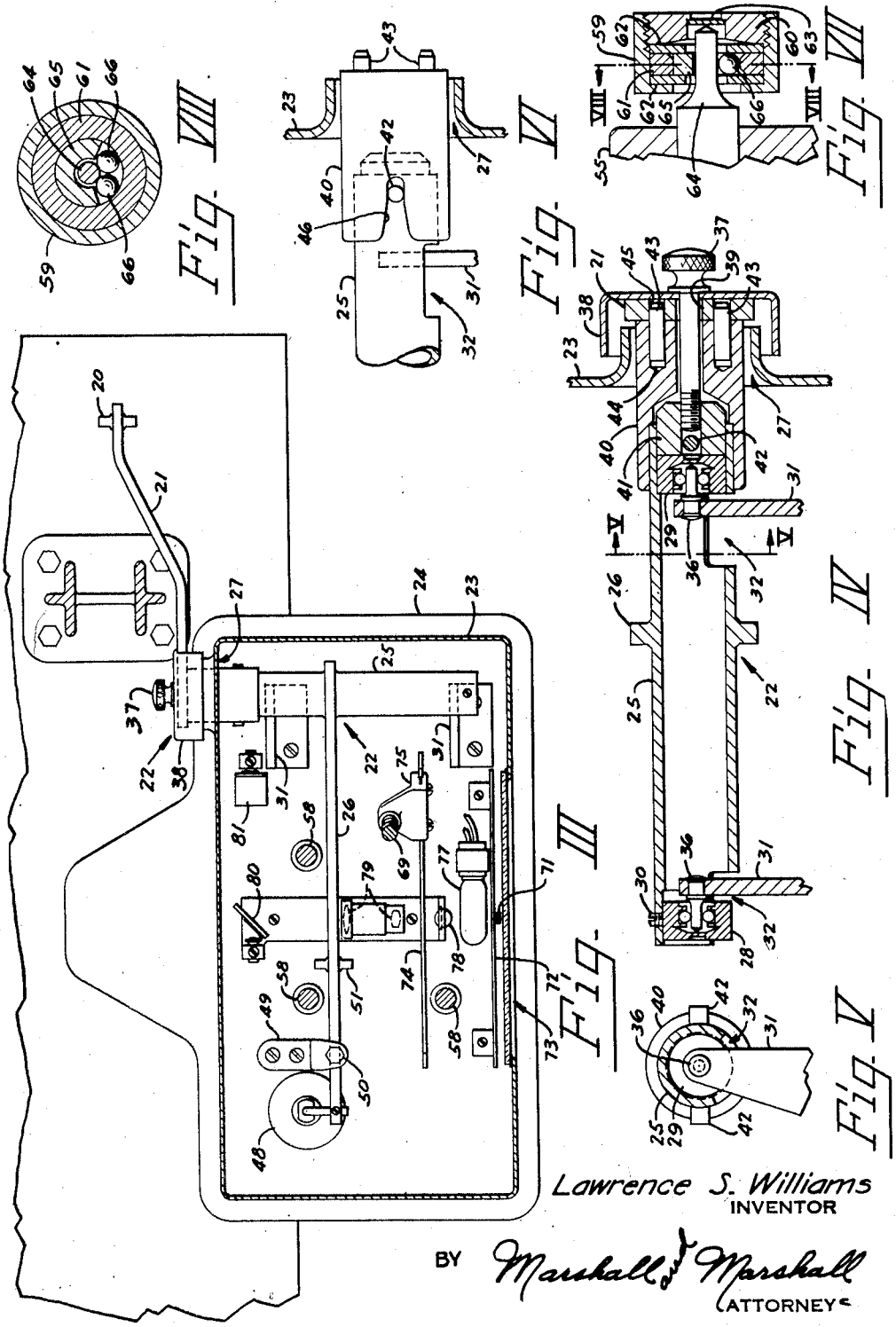

Patented Mar. 7, 1944

2,343,622

UNITED STATES PATENT OFFICE 2,343,622

WEIGHING SCALE

Lawrence S. Williams, Toledo, Ohio, assignor to Toledo Scale Company, Toledo, Ohio, a corporation of New Jersey Application November 28, 1941, Serial No. 420,825

10 Claims. (Cl. 265—58)

This invention relates to devices of the type in which an image of a transparent chart moved by automatic load counter-balancing mechanism is projected onto a screen to afford highly magnified indication of the weights of loads, and more particularly to means for connecting such devices to conventional weighing scale levers.

So-called projecting scales have been developed for the purpose of overcoming one of the major difficulties with standard scales, such as beam, cylinder or dial scales. The indication afforded by a beam scale is very rough, since the balance position is shown only by a comparison between the horizontal position of the beam when the load has been balanced by means of the counterpoises and a rough indicator in the trig loop which shows true horizontal position. The indications afforded by cylinder and dial scales are limited by the mass of the movable portion of the indicating means and by the maximum distance through which such movable portion can be moved by load counterbalancing mechanism. Thus the scale is limited in the number of indicia which can be displayed by a movable chart or indicated by a movable indicator, and also in the size of such indicia.

Projection scales solve this difficulty by providing a small light transparent chart which can carry a large number of minute indicia and, through projection, by enlarging these indicia to sufficient size and clarity for easy reading. Because of the advantages of projection, it sometimes is desirable to be able to connect projecting attachments to various types of standard scales already in use and thus to receive the benefits of the projection scale without having to purchase a large amount of adapting parts or replacement parts in order to adapt the present scale for use with the projecting scale attachment.

However, the means employed for mounting the load responsive elements of a projecting scale, with very small indicia and projected indication of relatively large size, must be kept as friction free as possible because any error caused thereby will be greatly enlarged by the magnification resulting from projecton.

This requirement introduces a second problem into the construction of projecting scale attachments. The "universality" of connection would be possible if the projecting scale attachment were constructed so that the direction of pull or force transmission from the scale to the attachment could be varied, i. e., could be from above the load counterbalancing mechanism, from below it or from either side. Construction of this kind, however, would require the use of universal direction bearings for the load counterbalancing mechanism and such bearings are not free enough from friction to properly mount such sensitive mechanism. Friction must be kept at a minimum in such mountings, as in the indicating means, so that the accuracy of the projecting attachment will not be impaired. Therefore, such bearing means should be of the constant-direction-of-force-application type such as knife edges and V bearings, or, more preferably, low friction ball bearings.

It is an object of this invention to provide a projecting attachment which can be used with any standard beam type scale without the necessity of replacing the scale beam with a new beam particularly constructed for use with the projecting attachment.

It is another object of this invention to provide a projecting scale which may be located so that the connections from the load receiving portion of the scale to the projection device may be vertical or horizontal and on either side of the projection device and yet the direction of force application on the load counterbalancing mechanism will be constant so that low friction bearing means may be used to mount such mechanism.

It is another object of this invention to provide an adjustable main lever for a projection device which can be adjusted for connection with load receiving mechanism from any one of several directions and which transmits force to the load counterbalancing mechanism of such device in the same direction regardless of how it is connected.

It is still another object of this invention to provide a main lever for a force measuring instrument, the lever arms of which may be relatively angularly adjusted.

It is a further object of this invention to provide a main lever for a projecting attachment which extends out of the housing of such attachment in such a way that the lever can be disassembled quickly, will not require a large opening in such housing and will not hamper the removal of such housing.

More specific objects and advantages are apparent from the description, in which reference is had to the accompanying drawings illustrating a preferred form of attachment embodying the invention.

In the drawings:

Fig. I is a view in elevation of a standard beam scale associated with a projection attachment embodying the invention.

Fig. II is a fragmentary detailed view, partly in elevation and partly in section, of a projecting device embodying the invention.

Fig. III is a horizontal sectional view, taken substantially from the position indicated by the line III—III of Fig. II.

Fig. IV is a fragmentary vertical sectional view on an enlarged scale of a portion of the device embodying features of the invention.

Fig. V is a detailed view taken from the position indicated by the line V—V of Fig. IV.

Fig. VI is a fragmentary view in elevation of a portion of the mechanism shown in Fig. IV.

Fig. VII is a fragmentary vertical sectional view on an enlarged scale of a portion of the mechanism illustrated in Fig. II.

Fig. VIII is a vertical sectional view taken substantially on the line VIII—VIII of Fig. VII.

These specific drawings and the specific description that follows merely disclose and illustrate the invention and are not intended to impose limitations upon the claims.

A main frame 10 has mounted thereon a fulcrum stand 11 on which is pivotally supported a scale beam 12. A pull rod 13 is connected to load receiving levers (not shown) and is pivotally connected to the beam 12 for transmitting the load on the load receiver to the beam 12. The beam 12 is equipped with poises 14 for counterbalancing tare weights and a trig and locking loop 15. A pivot 16 (Fig. II), mounted in the end of the beam 12, is engaged by a bearing 17 held in the upper end of a link 18. The lower end of the link 18 carries a bearing 19 which is engaged by a pivot 20 fastened in the end of an outer arm 21 of a main lever 22.

A housing 23 is mounted on a base 24 which is attached to the frame 10. The main lever 22 consists of the arm 21, a pipe body 25 (Fig. III) on which the arm 21 is mounted, and a second arm 26 fixedly attached to the body 25. The pipe-like body 25 extends out of the housing 23, through an opening 27, and has connected to its outer end the arm 21. The pipe body 25 (Fig. IV) is pivotally mounted by means of bearings 28 and 29 which are located within the pipe body 25. The bearing 28 is held therein by a set screw 30 which is screwed into the wall of the pipe body 25, and the bearing 29 is held in place by a friction fit. Brackets 31 (see also Fig. II) are mounted on the base 24 and their upper ends extend into the interior of the pipe body 25 through slots 32 in the walls thereof. Horizontal stub axles 36 are fastened in the upper ends of the brackets 31 and extend into the bearings 28 and 29 to serve as pivots on which the pipe body 25 oscillates. The stub axles 36 are turned outwardly to give a wide support to the pipe body 25 and prevent its being rocked on a transverse axis. The arm 21 is attached to the outer end of the pipe body 25 in the following manner: A thumb screw 37 extends through a cap-like cover 38, through a hole 39 bored in the arm 21, through the hollow interior of a sleeve 40 which surrounds the end of the pipe-like body 25, and screws into a plug 41 which is fastened in the end of the pipe-like body 25. A pin 42 extends through holes bored in the wall of the pipe-like body 25 and through the plug 41 at right angles to the threaded socket in the plug 41 in which the thumb screw 37 is screwed. The pin 42 thus holds the plug 41 in the pipe-like body 25 preventing both relative longitudinal and rotative movement.

Pins 43 are fitted into longitudinally bored holes 44 in the sleeve 40 which holes are parallel and symmetrically spaced around the hollow interior of the sleeve. The pins 43 extend horizontally from the end of the sleeve 40 and enter holes 45 similarly bored in the lever arm 21. Both ends of the pin 42 (Fig. VI) extend outside the pipe body 25 and are engaged in slots 46 in the sleeve 40 to prevent relative rotative movement of the sleeve 40 and the pipe body 25.

Thus, by removing the thumb screw 37 and the cap 38, the lever arm 21 may be removed from the pins 43 and the sleeve 40 may then be removed from the pipe body 25. The lever arm 21 may be assembled with relation to the pipe body 25 and lever arm 26, as shown in the drawings, or, by separating the lever arm 21 and the sleeve 40 and reassembling them with the pins 43 in different holes 45, the arm 21 may be mounted on the pipe body 25 in a different angular relationship to the horizontally extending lever arm 26.

The opposite end of the lever arm 26 from its connection with the pipe body 25 (Fig. II) is connected to a vertical rod 47 which is attached to the plunger of a motion damping dashpot 48 mounted on the base 24. A bracket 49 is mounted with adjustabe stops 50 to limit the angular movement of the lever arm 26. A pivot 51, mounted in the lever arm 26, engages a bearing yoke 52 which is attached to the lower end of a metallic ribbon 53 extending over, and clamped to, a sector cam 54. The sector cam 54 is an integral portion of a load counterbalancing pendulum 55 which is mounted in bearings 56 clamped in a cross arm 57 supported by frame members 58.

Each of the bearings 56 consists of an outer housing 59 (Figures VII and VIII) in which is held, by means of a retaining nut 60, an outer race 61, two side wall members 62 and a thrust disk 63. The thrust disk 63 is engaged by the pointed end of a trunnion 64 which extends from the pendulum 55 into the bearing 56 and serves as a pivot for the pendulum 55. A C shaped spacer 65 is located in the space between the outer race 61 and the trunnion 64. Two balls 66 are located in the space between the opposing faces of the spacer 65 to support the trunnion 64. The spacer 65 prevents the balls 66 from reaching positions diametrically opposed on opposite sides of the trunnion 64 in which case they would no longer support the trunnion.

The angular relation between the faces of the spacer 65 is such that the space between them is large enough to permit the full travel of the balls 66 when making a partial revolution under impetus of the oscillation of the trunnion 64. The space is of just sufficient size that, even if the balls spread slightly apart because of a jar or shock to the mechanism, at the end of each oscillation they will be brought almost together again to afford the best and most friction free support for the trunnion 64.

The pendulum 55 has two pendulum weights 67 and 68 which are adjustably mounted on stems 69 and 70 and may be radially moved thereon to vary their load counterbalancing ability. Attached to the pendulum 55 is an indicator arm 71 which sweeps over an arcuately arranged chart 72 (Figures I and III), located immediately behind a windowed opening 73 in the front of the housing 23, to indicate approximate weight and approach to correct weight. An arcuate transparent chart 74 (Figures II and III) is clamped in a bracket 75 on the lower end of the stem 69 and carries a series of indicia 76. A lamp 77 and a condensing lens 78 are located on the same horizontal line at right angles to the plane of movement of the chart 74 and are adapted to project light through the indicia 76 which are swung into projecting position by movements of the stem 69 of the pendulum 55 under loads on the scale. Projecting lenses 79 are coaxially arranged with the condensing lens 78 but on the opposite side of the chart 74 and project an image of the indicia 76 toward the back of the housing 23 where it strikes a mirror 80 which reflects the image horizontally onto a second mirror 81 which reflects the image upwardly through the housing 23 onto a third mirror 82 located in the upper portion of the housing 23. The mirror 82 again reflects the image horizontally toward the front of the housing 23 and onto a screen 83 mounted in front of an opening 84 in the housing 23 through which an enlarged projected image 85 of the indicia 76 can be viewed.

The main lever construction disclosed herein has many advantages. Because of the form of the pipe body 25 and the sleeve 40, the sleeve 40 can be removed from the exterior of the housing 23 and the housing can be lifted off the device, free of interference.

The cooperation between the pipe body 25 and sleeve 40 in extending the lever 22 outside of the housing 23, for attachment to the levers of the weighing scale with which it is used, permits the opening 27 to be small and circular. If the lever arm 21 extended through the housing, the opening for it would have to be rectangular. In the construction herein described, the opening 27 can be sealed, by the cap 38, against ingress of grit and dirt which would injure the surface of the mirror and dirty the transparent chart resulting in a projected image which is "fuzzy" and indistinct.

In addition, because of the ease of attachment of the lever arm 21 and its attachability at various angular relations to the lever arm 26, the housing 23 of the projecting device may be located above, below or at either side of its connection point with the lever of the scale with which it is to be used. This provides the flexibility of mounting desirable in an attachment for use with various types and makes of weighing scales.

The embodiment of the invention that has been disclosed may be modified to meet various requirements.

Having described the invention, I claim:

1. In a projecting weighing device for use with load receiving mechanisms, in combination, load counterbalancing and indicating mechanism and a main lever connecting said load receiving mechanism to said load counterbalancing and indicating mechanism, said lever having two arms, one of said arms being connected to said load receiving mechanism and the other of said arms being connected to said load counterbalancing and indicating mechanism, said arms being relatively angularly adjustable throughout a wide range about the pivot line of said lever to permit various directions of connection between said load receiving mechanism and said lever while maintaining the direction of connection between said lever and said load counterbalancing and indicating mechanism.

2. A projecting weighing attachment for use with scales of the beam type comprising load counterbalancing mechanism, a transparent indicia bearing chart attached to said load counterbalancing mechanism, means for projecting images of said chart to indicate the weights of loads on said scale, and a main lever connected to said load counterbalancing mechanism and to said beam type scale, said main lever comprising a pivotally mounted main body, an arm fixedly attached thereto and connected to said load counterbalancing mechanism and a second arm angularly adjustable about the pivot line of said body with respect to said fixedly attached arm to vary the direction of connection between said main lever and said beam type scale.

3. A main lever for a projection weight indicating device for use with scales of the beam type comprising a main tubular body pivotally mounted on bearings concentrically located with respect to the longitudinal axis of said body within said body and engaging brackets entering slots in the wall of said body, and two arms extending transversely from said body, one of said arms being fixedly attached to said body and the other of said arms being angularly adjustable relative to the first mentioned arm on the pivot line of said body, the adjustable one of said arms being connected to said beam type scale.

4. In a weighing scale, in combination, load receiving mechanism, load counterbalancing mechanism including a pivotally mounted load responsive member and bearings for pivotally mounting said member, each of said bearings having an outer race, two balls located in said race and spacer means to retain both of said balls on one side of a line passing through the center of said bearing, said member being mounted in said bearings on trunnions extending into said bearings concentrically with said outer races and resting on said two balls, projection indicating means including a transparent chart operatively connected to said load responsive member, and a main lever connecting said load receiving mechanism to said load counterbalancing mechanism, said lever comprising a main pivotally mounted body, an arm extending transversely from said body and connected to said load counterbalancing mechanism to transmit force applied to said lever to said load counterbalancing mechanism, and a second arm angularly adjustable about the pivot line of said body to vary the direction of connection between said load receiving mechanism and said lever.

5. In a projecting weighing attachment for use with load receiving mechanism, in combination, load counterbalancing mechanism including a load responsive member, means for pivotally mounting said member, said means including bearings having an outer race, two balls located in said race and spacing means occupying the space within said race except that portion of such space in which said balls revolve, and a trunnion extending from said member concentrically into said bearing race and supported on said two balls, projection indicating means including a transparent chart operatively connected to said load responsive member, and a main lever for transmitting force from said load receiving mechanism to said load counterbalancing mechanism, said lever comprising a pivotally mounted body and two transversely extending arms, one of said arms being angularly adjustable about the pivot line of said body to vary the direction of transmission of force from said load receiving mechanism to said lever and the other of said arms being connected to said load counterbalancing mechanism to transmit force to said load counterbalancing mechanism in the same direction at all times.

6. In a projecting attachment for a weighing scale, in combination, load counterbalancing mechanism, projecting indication mechanism operatively associated therewith, a housing for said attachment, and a main lever for transmitting force from said weighing scale to said load counterbalancing mechanism, said main lever having a lever arm and a pipe-like body pivotally mounted within said housing on a line concentric with said body, a sleeve-like extension member nonrotatably and concentrically engageable with said body and extending through a relatively small opening in said housing, a second arm and means for securing said second arm on the outer end of said sleeve in various fixed angular relationships to the first mentioned arm.

7. In a projecting attachment for a weighing scale, in combination, load counterbalancing mechanism, projection indicating mechanism operatively associated therewith, a housing for said attachment, and a main lever for transmitting force from said weighing scale to said load counterbalancing mechanism, said main lever having a lever arm and a pipe-like body pivotally mounted on its longitudinal axis within said housing, said pipe-like body extending exteriorly of said housing through an aperture therein only slightly larger than the cross sectional area of said body and a second arm located on the exterior of said housing and connectable to said weighing scale.

8. In a projecting attachment for a weighing scale, in combination, load counterbalancing mechanism, projection indicating mechanism operatively associated therewith, a housing for said attachment, and a main lever for transmitting force from said weighing scale to said load counterbalancing mechanism, said main lever having a lever arm and a pipe-like body pivotally mounted on its longitudinal axis within said housing, a second arm located exteriorly of said housing member and connectable to said weighing scale, and a connection member for connecting said second arm to said body through an aperture in said housing of a size only slightly larger than the cross sectional area of said pipe body.

9. In a projecting attachment for a weighing scale, in combination, load counterbalancing mechanism, projection indicating mechanism operatively associated therewith, a housing for said attachment, and a main lever for transmitting force from said weighing scale to said load counterbalancing mechanism, said main lever having a lever arm and a pipe-like body pivotally mounted within said housing on a line concentric with said body, a sleeve-like extension member nonrotatably and concentrically engageable with said body and extending through a relatively small opening in said housing, a second arm and means for securing said second arm on the outer end of said sleeve.

10. A motion and force transmitting lever comprising a tubular body and lever arms extending transversely from said tubular body for receiving and transmitting forces, said lever being fulcrumed on bearings located concentrically within said tubular body and engaging brackets inserted through cut-away portions into said body.

LAWRENCE S. WILLIAMS.